(12) United States Patent
Guilford

(10) Patent No.: US 8,876,396 B2
(45) Date of Patent: Nov. 4, 2014

(54) ROLLER BEARING WITH KNURLED WEAR RESISTANT EXTERIOR SURFACE AND METHOD OF MANUFACTURING THE SAME

(71) Applicant: Roller Bearing Company of America, Inc., Oxford, CT (US)

(72) Inventor: Werner B. Guilford, Hulmeville, PA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/355,529

(22) PCT Filed: Nov. 2, 2012

(86) PCT No.: PCT/US2012/063269
§ 371 (c)(1),
(2), (4) Date: Apr. 30, 2014

(87) PCT Pub. No.: WO2013/067314
PCT Pub. Date: May 10, 2013

(65) Prior Publication Data
US 2014/0254970 A1    Sep. 11, 2014

Related U.S. Application Data

(60) Provisional application No. 61/555,078, filed on Nov. 3, 2011.

(51) Int. Cl.
*F16C 33/58* (2006.01)
*F16C 43/04* (2006.01)
*F16C 33/62* (2006.01)
*F16C 43/06* (2006.01)

(52) U.S. Cl.
CPC ............... *F16C 33/586* (2013.01); *F16C 33/62* (2013.01); *F16C 43/065* (2013.01)
USPC ............. 384/549; 384/24; 384/449; 384/569; 384/625

(58) Field of Classification Search
CPC ....... F16C 33/586; F16C 33/62; F16C 43/065
USPC ........................... 384/24, 549, 449, 569, 625
See application file for complete search history.

(56) References Cited

U.S. PATENT DOCUMENTS

| | | | |
|---|---|---|---|
| 2,376,779 A | 5/1945 | Kendall | |
| 4,076,337 A | 2/1978 | Childress | |
| 5,290,070 A | 3/1994 | Deits et al. | |
| 5,577,847 A | 11/1996 | Nakamura et al. | |

FOREIGN PATENT DOCUMENTS

| | | |
|---|---|---|
| DE | 9117069 U1 | 7/1995 |
| EP | 1950436 A1 | 7/2008 |
| JP | 7-180028 A | 7/1995 |
| JP | 11-303859 A | 11/1999 |

OTHER PUBLICATIONS

International Search Report and Written Opinion from corresponding PCT Application No. PCT/US2012/063269, dated Mar. 5, 2013.
International Preliminary Report on Patentability from corresponding PCT Application No. PCT/US2012/063269, dated Jan. 16, 2014.

*Primary Examiner* — Thomas R. Hannon
(74) *Attorney, Agent, or Firm* — MKG, LLC

(57) ABSTRACT

A roller bearing includes an outer ring having a substantially cylindrical internal bearing surface and an outside surface defining a plurality of protuberances. A protective coating is applied to the outside surface of the outer ring. An inner ring is coaxially disposed at least partially in the outer ring and has a substantially cylindrical external bearing surface. The external bearing surface and the internal bearing surface define an annular cavity in which a plurality of rolling elements is disposed. The rolling elements are in rolling engagement with the external bearing surface and the internal bearing surface. The outside surface of the outer ring can be case hardened, for example the outer ring can be carburized. The outside surface of the outer ring can be knurled. A method of manufacturing such a bearing is also disclosed.

25 Claims, 5 Drawing Sheets

ROLLER BEARING WITH KNURLED WEAR RESISTANT EXTERIOR SURFACE AND METHOD OF MANUFACTURING THE SAME

FIELD OF THE INVENTION

The present invention is generally directed to roller bearings and is more specifically directed to roller bearings having a knurled outside surface having a protective coating applied thereto and being case hardened.

BACKGROUND OF THE INVENTION

Many types of bearings can be used to support radial, thrust, or combination radial and thrust loads. Such bearings include ball, roller, plain, journal, and tapered roller bearings. Typically, roller bearings include an outer ring having a generally cylindrical outer surface and a generally cylindrical inner surface defining an interior area of the outer ring. An inner ring having a generally cylindrical external surface is disposed in the interior area of the outer ring. A plurality of rolling elements, such as ball bearings or needle bearings are disposed in a cavity between the outside surface of the inner ring and the inner surface of the outer ring. It should be understood to a person of ordinary skill in the art and familiar with this disclosure that terms bearing and roller bearing refer to and include cam followers.

The outer ring is rotatable relative to the inner ring. For example, the inner ring may be secured to a shaft and the outer ring can rotate relative to the inner ring and the shaft. In certain applications, where the outer ring rotates, an exterior surface of the outer ring may come in contact with components of machines shafts, belts and the like.

SUMMARY OF THE INVENTION

The present invention resides in one aspect in a roller bearing. The roller bearing includes an outer ring having a substantially cylindrical internal bearing surface and an outside surface defining a plurality of protuberances. The outer ring further includes a protective coating applied to its outside surface. An inner ring is coaxially disposed at least partially in the outer ring and has a substantially cylindrical external bearing surface. The external bearing surface and the internal bearing surface define an annular cavity in which a plurality of rolling elements is disposed. The rolling elements are in rolling engagement with the external bearing surface and the internal bearing surface.

In some embodiments of the present invention, the protective coating is chrome plating. In yet further embodiments of the present invention the chrome plating is thin dense chrome plating. In yet further embodiments of the present invention, the protective coating is substantially between 0.000025 inches and 0.0005 inches in thickness. In yet further embodiments of the present invention, the protective coating is corrosion resistant and wear resistant.

In some embodiments of the present invention, the outside surface of the outer ring is knurled. In yet further embodiments of the present invention, the outer ring is manufactured from a low alloy steel comprising nickel, chromium and molybdenum.

In some embodiments of the present invention, the outside surface of the outer ring is case hardened. For example, the outside surface of the outer ring may be case hardened by carburizing. In some embodiments of the present invention, the outer ring is manufactured from one of AISI 9310 and AISI 52100. In some embodiments, the outside surface of the outer ring is case hardened to a depth of substantially between 0.04 inches and 0.07 inches. In some embodiments of the present invention, the outside surface of the outer ring has a hardness of at least 46 Rockwell C scale.

The present invention resides in another aspect in a roller bearing having an outer ring with an internal bearing surface and an outside surface. The outside surface defines a plurality of protuberances and is case hardened. A protective layer of chrome plating is applied to the outside surface of the outer ring. An inner ring is disposed in the outer ring and has an external bearing surface. A plurality of rolling elements is disposed in an annular cavity defined by the external bearing surface and the internal bearing surface.

The present invention resides in yet another aspect in a method of manufacturing a roller bearing. The method includes the steps of providing an outer ring having a substantially cylindrical internal bearing surface and an outside surface, carburizing the outer ring, knurling the outside surface of the outer ring, and plating the outer ring with chrome. In some embodiments, the method further includes the steps of providing an inner ring, disposing the inner ring in the outer ring, providing a plurality of rolling elements, and disposing the plurality of rolling elements in an annular cavity between the inner ring and the outer ring.

DETAILED DESCRIPTION OF THE INVENTION

Figure 1:
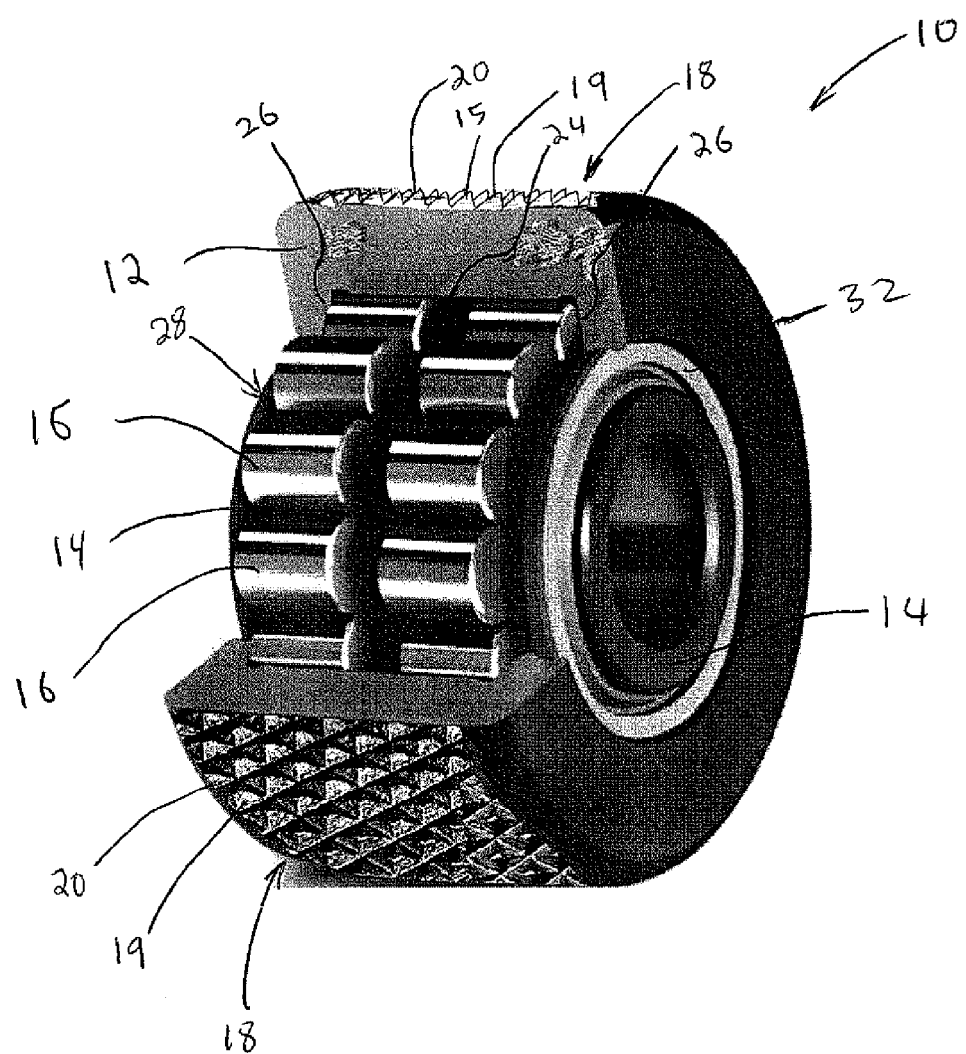
FIG. 1 is a perspective view of a roller bearing in accordance with an embodiment of the present invention in which a portion of the outer ring is cut away.
Figure 2:
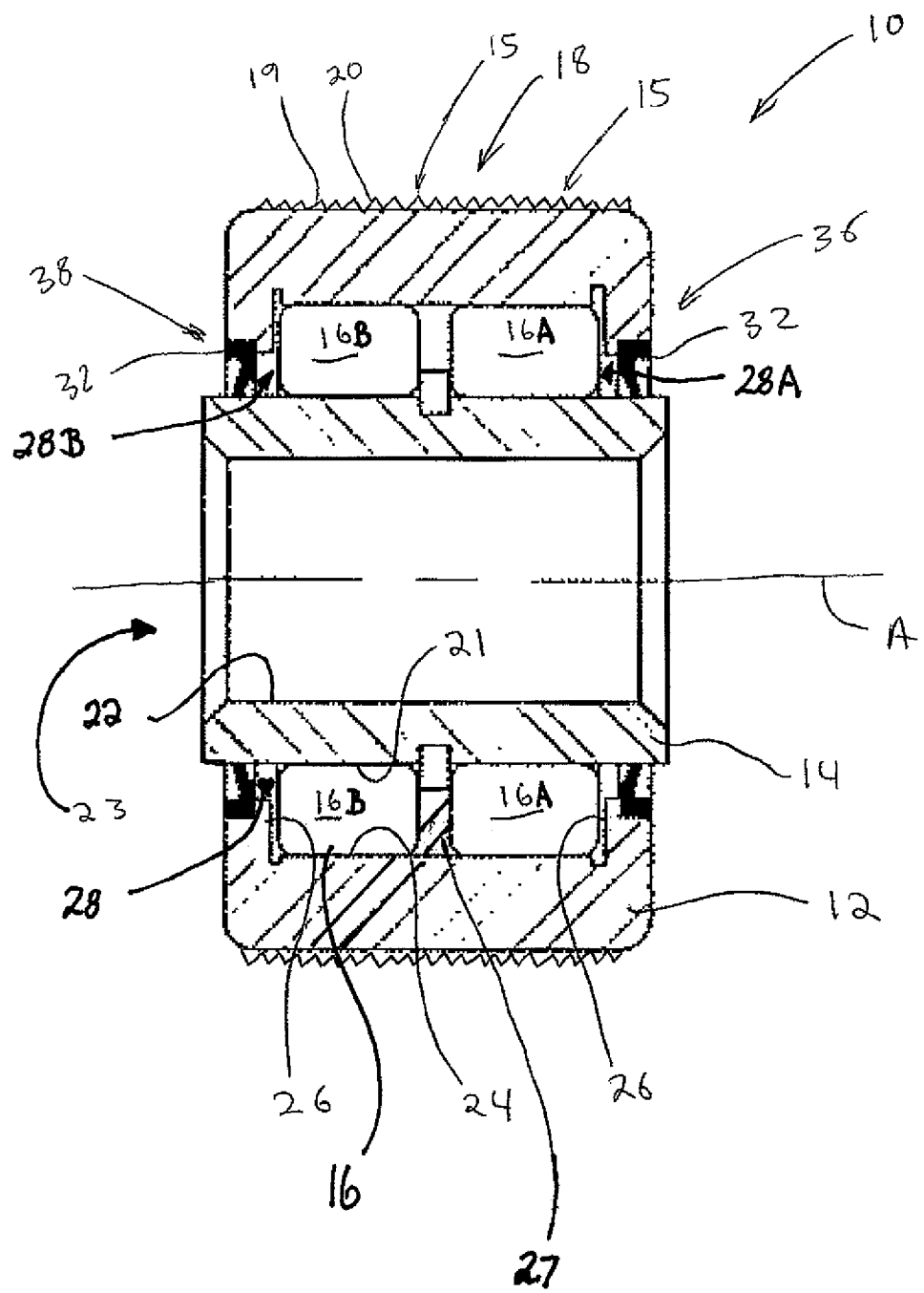
FIG. 2 is a cross sectional view of the roller bearing shown in FIG. 1.
Figure 3:
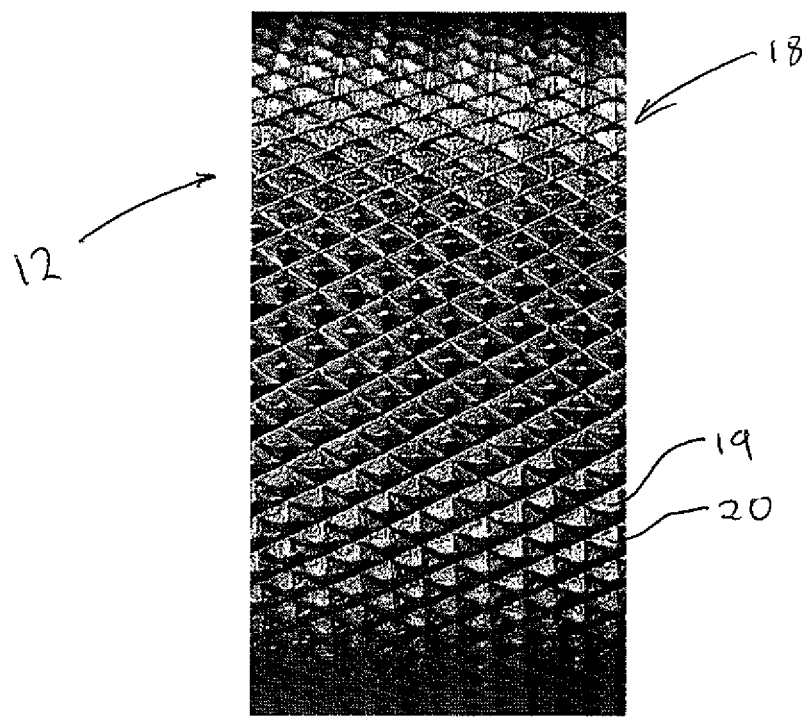
FIG. 3 is an enlarged view of an exterior surface of the roller bearing shown in FIG. 1 in which a knurled finish is shown on the outside surface of the outer ring.

As shown in FIGS. 1-4, a roller bearing is generally designated by the reference numeral 10. The roller bearing 10 includes an outer ring 12 and an inner ring 14 disposed partially within the outer ring. A plurality of rolling elements 16, for example needle bearings, is positioned between the outer ring 12 and the inner ring 14. The outer ring 12 defines a substantially cylindrical outside surface 18 having a plurality of protuberances 15 thereon. Although the FIGS. show a bearing 10 having a substantially cylindrical outer ring 12, a person of ordinary skill in the art and familiar will understand that the present invention is not limited in this regard, and that the outside surface may have different shapes depending on its function and purpose.

The inner ring 14 has a substantially cylindrical external bearing surface 21 and includes a substantially cylindrical inner wall 22 defining a bore 23 which extends through the inner ring. The outer ring 12 has a substantially cylindrical internal bearing surface 24 including two radially inwardly projecting shoulders 26. The inner ring 14 is coaxially disposed in the outer ring 12. The inner ring 14 and the outer ring 12 cooperate to define an annular cavity 28 therebetween. The plurality of rolling elements 16 is disposed in the annular cavity 28. In the illustrated embodiment 10, the rolling elements 16 are shown as needle bearings. However, the present invention is not limited in this regard as other types of rolling elements 16 can be employed, including, but not limited to, ball bearings and tapered bearings.

The rolling elements 16 are in rolling engagement with the external bearing surface 21 and the internal bearing surface 24 so that the inner ring 14 and the outer ring 12 are rotatable relative to each other about a common axis A. The plurality of rolling elements 16 is positioned between the radially inwardly projecting shoulders 26. The roller bearing 10 also includes two seals 32 disposed between the external bearing surface 21 and the internal bearing surface 24 for retaining a lubricant within the annular cavity 28 and for inhibiting the flow of particulate from an area outside the roller bearing to an area inside the annular cavity 28. One of the seals 32 is positioned at an outboard end 36 of the roller bearing 10 and another one of the seals 32 is positioned at an in-board end 38 of the roller bearing. While two seals 32 have been shown and described, the present invention is not limited in this regard as less than two seals (for example none) or more than two seals can be used without departing from the broader aspects of the present invention.

The outer ring 12 and inner ring 14 are manufactured from a low alloy steel containing nickel, chromium and molybdenum. The outer ring 12 and/or the inner ring 14 are carburized and/or case hardened. In one embodiment, the outer ring 12 is manufactured from an AISI 9310 low alloy steel, and the inner ring 14 is manufactured from an AISI 8620 low alloy steel. Although specific materials are disclosed herein, a person of ordinary skill in the art and familiar with this disclosure will understand that the present invention is not limited in this regard, and that other materials may be used with the present invention.

Portions of the roller bearing 10 shown in FIGS. 1-4, for example the inner ring 12 or the outer ring 14, are case hardened. In the embodiment shown in FIGS. 1-4, the bearing is carburized to case harden the rings 12, 14. The steel is introduced to a carbon rich environment and elevated temperatures for a certain amount of time, and then quenched so that the carbon is locked in the structure. Typically, the longer the steel is held in the carbon-rich environment the greater the carbon penetration will be and the higher the carbon content. By varying the parameters of the carburizing process, it is possible to control the depth of case hardening on the subject part. In the embodiment disclosed in the FIGS., the outer ring and/or the inner ring have a hardness of 47 Rockwell C scale or greater. It should be understood however, the hardness level of the rings 12, 14, is not limited in this regard and may vary.

Figure 4:
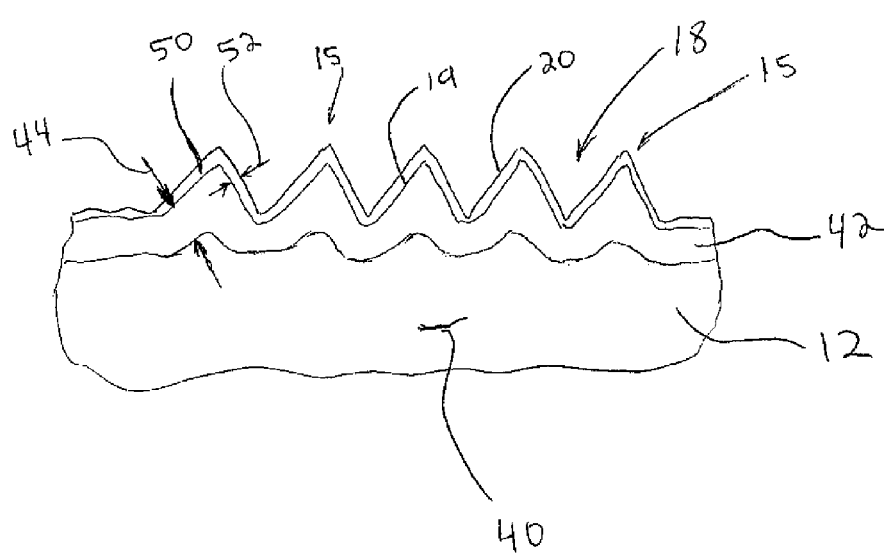
FIG. 4 is an enlarged view of the knurled outside surface of the roller bearing shown in FIG. 1.

As illustrated in FIG. 4, the case hardening results in a tough inner core 40 and a hard outer layer 42 having a thickness 44 of about 0.04 inches to about 0.07 inches. The outer layer 44 has a hardness of 47 Rockwell C scale or greater. In one embodiment, the outer ring 12 and/or the inner ring 14 are through hardened such that inner core 40 and the outer layer have a hardness of 47 Rockwell C scale or greater. In another embodiment the surface hardness of the outer ring 12, for example the knurled finish 19 on the outside surface 18 has a hardness of at least 47 Rockwell C scale. While the outer ring 12 and the inner ring 14 are described as being manufactured from a low alloy steel the present invention is not limited in this regard as other suitable alloys may be employed including but not limited to stainless steel and precipitation hardened alloys. Although, the hard outer layer 42 is shown and described as having the thickness 44 of about 0.04 inches to about 0.07 inches, the present invention is not limited in this regard as other thickness greater to 0.07 inches or less than 0.04 inches can also be employed without departing from the broader aspects defined herein.

As illustrated in FIG. 4, the outside surface 18 has protective coating 50 having a thickness 52 of about 0.000025 inches to about 0.0005 inches applied thereto. In one embodiment, the coating 50 is plated chromium. The protective coating is wear resistant and/or corrosion resistant. The coating 50 can be applied by a plating process such as a thin-dense chrome plating process resulting in a surface hardness of about Rockwell C 72. The protective coating 50 having a thickness of about 0.000025 inches to about 0.0005 inches is applied to all surfaces (e.g., exterior and interior surfaces) of the outer ring 12 and/or the inner ring 14. Although, the outside surface 18 and other surfaces of the outer ring 12 and the inner ring 14 are shown and described as having the corrosion and wear resistant coating 50 having a thickness 52 of about 0.000025 inches to about 0.0005 inches applied thereto, the present invention is not limited in this regard as other thicknesses greater to 0.0005 inches or less than 0.000025 inches can also be employed without departing from the broader aspects defined herein. In one embodiment, the corrosion and wear resistant coating 50 has a hardness of 47 Rockwell C scale or greater. Although the protective coating 50 is described as being plated chromium, the present invention is not limited in this regard as other coating materials can be employed, including but not limited to ceramic coatings, diamond coatings and tungsten carbide coatings.

As illustrated in FIGS. 1-4, a plurality of protuberances 15 forms a knurled finish 19 on the outside surface 18. The knurled finish 19 is operable for gripping objects such as a shaft as illustrated below in FIG. 5. While the outside surface 18 is described and shown having the knurled finish 19 the present invention is not limited in this regard as other surface finishes such as but not limited to those having scoring, a plurality of depressions or holes therein, a plurality of linear grooves formed therein and a plurality of arcuate grooves formed therein, may also be employed without departing from the broader aspects disclosed herein.

Figure 5:
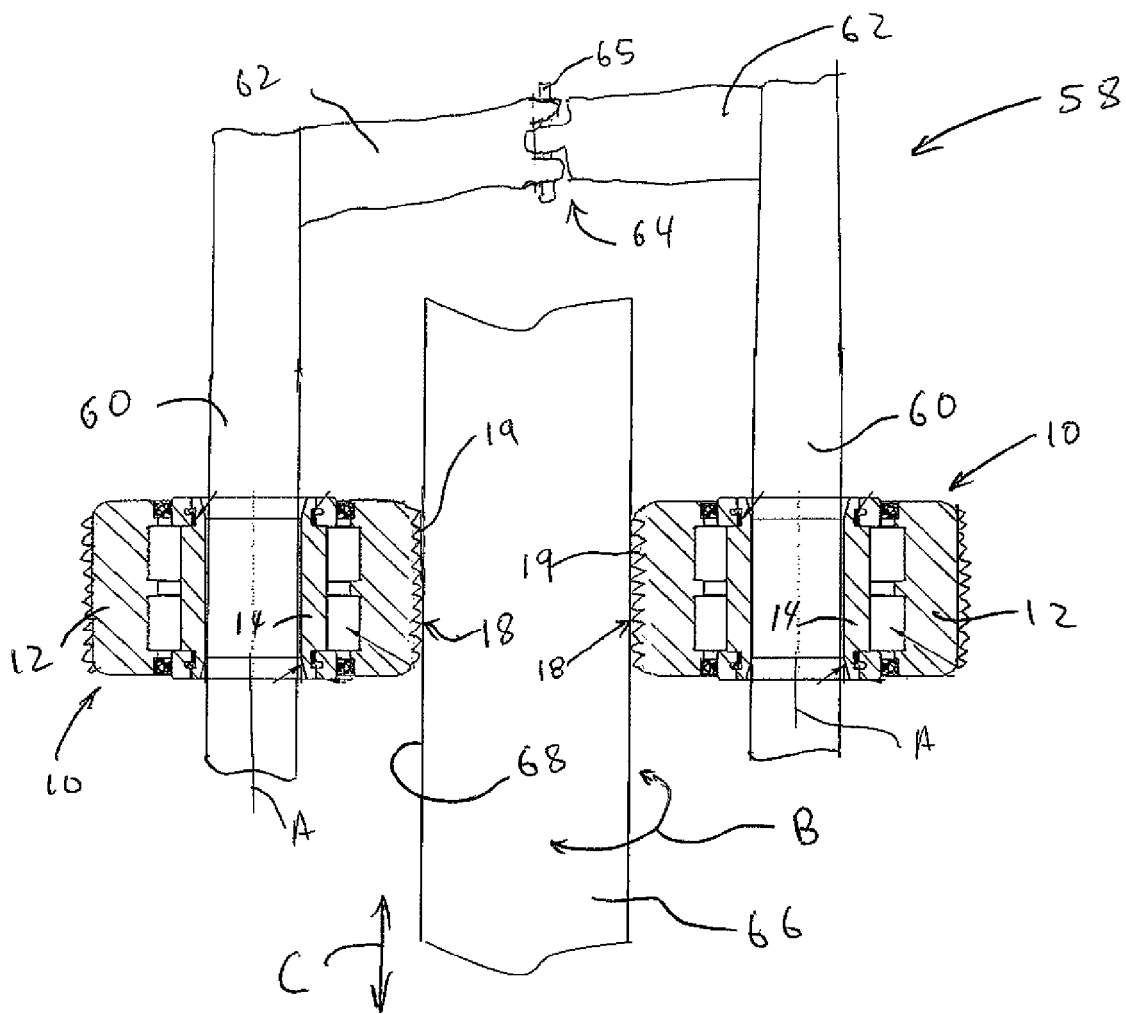
FIG. 5 is a schematic view of the roller bearing of FIG. 1, shown installed on a portion of an oil rig drilling unit.

Referring to FIG. 5, two of the roller bearings 10 are shown installed in a portion of an oil drilling rig 58. The oil rig 58 includes a set of jaws 64 defined by a pair of opposing arms 62 pivotally mounted to each other via a pin 65. Each of the arms 62 has a stud 60 extending outwardly therefrom. Each of the studs 60 have one of the roller bearings 10 secured to the inner ring 14 of the roller bearings 10 such that each of the studs are coaxial with the axis A of the respective roller bearing. The jaws 64 are configured to position the roller bearings 10 proximate to and/or engaged with a shaft 66 of the oil rig 58. The studs 60 are shown positioned parallel to the shaft 66. The shaft 66 defines a mating surface 68 on an exterior surface thereof. The shaft 66 is configured to rotate as shown by the arrow B and translate in the direction shown by the arrow C. In addition, the mating surface 68 of the shaft 66 has corrosive crude oil splattered thereon by operation of the oil rig 58. An actuator (not shown) moves the arms 62 towards and away from each other as required to grip or release the shaft 66. When the arms 62 are moved toward one another to a predetermined position, the outside surface 18 of the roller bearings 10 rollingly engage the mating surface 68 of and grip the shaft 66. The protuberances 15 of the knurled finish 19 rollingly grip the shaft 68 so that there is essentially no slippage of the shaft 66 relative to the outside surface 18 in the general direction of the arrow C. Thus the shaft 66 can rotate while being translated with and/or by the jaws 64 in the general direction shown by the arrow C. The case hardening or through hardening of the outside surface 18, the knurled finish 19 and the wear and corrosion resistant coating 20 cooperate to provide superior gripping ability and improved wear and corrosion resistance compared to other prior art bearings that are not hardened and have no corrosion and wear resistant coating applied thereto. In another embodiment the surface hardness of the outer ring 12, for example the knurled finish 19 on the outside surface 18 has a hardness of at least 3 Rockwell C scale points greater than a surface hardness of the mating surface 68 of the shaft 66 or other component which the knurled finish 19 on the outside surface 18 grips.

Referring back to FIG. 2, the internal bearing surface 24 of the outer ring 12 defines a third radially inwardly projecting shoulder 27 positioned approximately midway between the two radially inwardly projecting shoulders 26. When the inner ring 14 is coaxially disposed in the outer ring 12, the external bearing surface 21 of the inner ring 14 and the internal bearing surface 24 of the outer ring 12 cooperate to define a first annular cavity 28A and a second annular cavity 28B. The first annular cavity 28A extends radially between the external bearing surface 21 and the internal bearing surface 24 and laterally between the first and third radially inwardly projecting shoulders. The second annular cavity 28B extends radially between the external bearing surface 21 and the internal bearing surface 24 and laterally between the second and third radially inwardly projecting shoulders. A first plurality of rolling elements 16A is disposed in the first annular cavity 28A and a second plurality of rolling elements 16B is disposed in the second annular cavity 28B. The rolling elements 16A and 16B are in rolling engagement with the external bearing surface 21 and the internal bearing surface 24 so that the inner ring 14 and the outer ring 12 are rotatable relative to each other about the common axis A.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A roller bearing, comprising:
an outer ring having a substantially cylindrical internal bearing surface, an outside surface defining a plurality of protuberances configured to rollingly engage and grip a mating surface of a shaft, and the outer ring having a protective coating applied thereto;
an inner ring coaxially disposed at least partially in the outer ring about a common axis of rotation and having a substantially cylindrical external bearing surface;
the external bearing surface and the internal bearing surface defining an annular cavity therebetween; and
a plurality of rolling elements disposed in the annular cavity, the rolling elements being in rolling engagement with the external bearing surface and the internal bearing surface;
the plurality of protuberances are operable to rollingly engage the mating surface rotating about a mating surface axis of rotation, the mating surface axis of rotation being substantially parallel to the common axis of rotation; and
the plurality of protuberances are operable to grip the mating surface being translated along the mating surface axis of rotation.

2. The roller bearing of claim 1, wherein the protective coating is chrome plating.

3. The roller bearing of claim 1, wherein the chrome plating is thin dense chrome plating.

4. The roller bearing of claim 3, wherein the protective coating is substantially between 0.000025 inches and 0.0005 inches in thickness.

5. The roller bearing of claim 1, wherein the protective coating is corrosion resistant and wear resistant.

6. The roller bearing of claim 5, wherein the outside surface is knurled thereby defining the plurality of protuberances.

7. The roller bearing of claim 5, wherein the outer ring is manufactured from a low alloy steel comprising nickel, chromium and molybdenum.

8. The roller bearing of claim 5, wherein the plurality of protuberances defined on the outside surface of the outer ring is case hardened.

9. The roller bearing of claim 8, wherein the plurality of protuberances defined on the outside surface of the outer ring is carburized.

10. The roller bearing of claim 9, wherein the outer ring is manufactured from one of AISI 9310 and AISI 52100.

11. The roller bearing of claim 8, wherein the plurality of protuberances defined on the outside surface of the outer ring is case hardened to a depth of substantially between 0.04 inches and 0.07 inches.

12. The roller bearing of claim 1, wherein the plurality of protuberances defined on the outside surface of the outer ring has a hardness of at least 47 Rockwell C scale.

13. The roller bearing of claim 1, further comprising:
a first shoulder extending radially inwardly from a first end of the outer ring; and
a second shoulder extending radially inwardly from a second end of the outer ring;
wherein the plurality of rolling elements is disposed in the annular cavity between the first and second radially inwardly projecting shoulders.

14. The roller bearing of claim 13, further comprising:
a third shoulder extending radially inwardly from the outer ring between the first and second radially inwardly projecting shoulders;
the external bearing surface and the internal bearing surface defining a first annular cavity and a second annular cavity, the first annular cavity extending radially between the external bearing surface and the internal bearing surface and laterally between the first and third radially inwardly projecting shoulders, the second annular cavity extending radially between the external bearing surface and the internal bearing surface and laterally between the second and third radially inwardly projecting shoulders,
a first plurality of rolling elements disposed in the first annular cavity, the first plurality of rolling elements being in rolling engagement with the external bearing surface and the internal bearing surface; and
a second plurality of rolling elements disposed in the second annular cavity, the second plurality of rolling elements being in rolling engagement with the external bearing surface and the internal bearing surface.

15. The roller bearing of claim 1, further comprising:
a first seal disposed between the external bearing surface and the internal bearing surface for retaining a lubricant within the annular cavity at an outboard end of the annular cavity; and a second seal disposed between the external bearing surface and the internal bearing surface for retaining a lubricant within the annular cavity at the inboard end of the annular cavity.

16. The roller bearing of claim 1, wherein the plurality of protuberances are operable to prevent slippage of the mating surface in the direction substantially perpendicular to the common axis of rotation.

17. A roller bearing assembly, comprising:
a first roller bearing having a first common axis of rotation;
a second roller bearing having a second common axis of rotation;
each of the first and second roller bearing respectively comprising
an outer ring having a substantially cylindrical internal bearing surface, an outside surface defining a plurality of protuberances configured to rollingly engage and grip a mating surface, a first end and a second end, a first shoulder extending radially inwardly from the first end and a second shoulder extending radially inwardly from the second end, the outer ring having a protective coating applied thereto,
an inner ring coaxially disposed at least partially in the outer ring and having a substantially cylindrical external bearing surface and a bore extending therethrough,
the external bearing surface and the internal bearing surface defining an annular cavity, the annular cavity extending radially between the external bearing surface and the internal bearing surface and laterally between the first and second radially inwardly projecting shoulders, and
a plurality of rolling elements disposed in the annular cavity, the rolling elements being in rolling engagement with the external bearing surface and the internal bearing surface;
a first shaft extending through and secured to the inner ring of the first bearing, the first shaft being coaxial with the first common axis of rotation;
a second shaft extending through and secured to the inner ring of the second bearing, the second shaft being coaxial with the second common axis of rotation and substantially parallel to the first shaft; and
a third shaft extending between the outer rings of the first and second roller bearings, the third shaft positioned substantially parallel to the first and second shafts, the third shaft defining a mating exterior surface and a mating surface axis of rotation, the mating surface axis of rotation being substantially parallel to the first and second common axis of rotation;
the plurality of protuberances defined on the outside surface of the outer ring of the first and second roller bearings are operable to rollingly engage the mating exterior surface rotating about the mating surface axis of rotation; and
the plurality of protuberances defined on the outside surface of the outer ring of the first and second roller bearings are operable to grip the mating exterior surface being translated along the mating surface axis of rotation.

18. The roller bearing assembly of claim 17, the first and second roller bearings each further comprising:
a third shoulder extending radially inwardly from the outer ring between the first and second radially inwardly projecting shoulders;

the external bearing surface and the internal bearing surface defining a first annular cavity and a second annular cavity, the first annular cavity extending radially between the external bearing surface and the internal bearing surface and laterally between the first and third radially inwardly projecting shoulders, the second annular cavity extending radially between the external bearing surface and the internal bearing surface and laterally between the second and third radially inwardly projecting shoulders;
a first plurality of rolling elements disposed in the first annular cavity, the first plurality of rolling elements being in rolling engagement with the external bearing surface and the internal bearing surface; and
a second plurality of rolling elements disposed in the second annular cavity, the second plurality of rolling elements being in rolling engagement with the external bearing surface and the internal bearing surface.

19. The roller bearing assembly of claim 18, the first and second roller bearings each further comprising:
a first seal disposed between the external bearing surface and the internal bearing surface for retaining a lubricant within the first annular cavity; and
a second seal disposed between the external bearing surface and the internal bearing surface for retaining a lubricant within the second annular cavity.

20. The roller bearing assembly of claim 17, wherein the outside surface of the outer ring of the first and second roller bearings is knurled thereby defining the plurality of protuberances.

21. The roller bearing assembly of claim 17, wherein the plurality of protuberances defined on the outside surface of the outer ring of the first and second roller bearings are case hardened.

22. The roller bearing assembly of claim 17, wherein the plurality of protuberances defined on the outside surface of the outer ring of the first and second roller bearings are carburized.

23. The roller bearing assembly of claim 17, wherein the plurality of protuberances are operable to prevent slippage of the mating exterior surface in the direction substantially perpendicular to the first and second common axis of rotation.

24. A method of manufacturing a roller bearing, comprising the steps of:
providing an outer ring having an axis of rotation, a substantially cylindrical internal bearing surface and an outside surface;
carburizing the outer ring;
knurling the outside surface of the outer ring forming a plurality of protuberances therein that are configured to rollingly engage and grip a mating surface of a shaft, operable to rollingly engage the mating surface rotating about a mating surface axis of rotation substantially parallel to the outer ring axis of rotation, and operable to grip the mating surface being translated along the mating surface axis of rotation;
plating the outer ring with chrome.

25. The method of claim 24, further comprising the steps of:
providing an inner ring;
disposing the inner ring in the outer ring;
providing a plurality of rolling elements;
disposing the plurality of rolling elements in an annular cavity defined between the inner ring and the outer ring.

* * * * *